Nov. 18, 1969    K. PRESTON, JR    3,479,109
OPTICAL PHASE MODULATOR
Filed Dec. 16, 1964

INVENTOR.
Kendall Preston, Jr.
BY Edward R. Hyde Jr.
ATTORNEY.

United States Patent Office 3,479,109
Patented Nov. 18, 1969

3,479,109
OPTICAL PHASE MODULATOR
Kendall Preston, Jr., New Haven, Conn., assignor to The Perkin-Elmer Corporation, Norwalk, Conn., a corporation of New York
Filed Dec. 16, 1964, Ser. No. 418,719
Int. Cl. G02f 1/16
U.S. Cl. 350—161                        6 Claims

ABSTRACT OF THE DISCLOSURE

A device adapted to phase modulate a beam of light. A reflective and conductive film is stretched across a plurality of ridges which make up the top side of a nonconductive support. Electrical charges are established in the areas between the ridges by means of a dielectric tape which has on it a pattern of electrical charges. The tape is positioned adjacent the support, and is in communication with the areas between the ridges. These charges cause a downward deflection of the portions of the film which are located between the ridges. In use, a beam of light impinging on the film will, on reflection, be phase modulated at those portions which strike deflected portions of the film.

---

The present invention relates to an optical phase modulator of the type wherein a reflecting surface is selectively altered so as to change the phase of a beam of light incident upon the surface.

Optical phase modulators find particular application in display or indicator systems. In one well known modulator the modulating signal is supplied to an electron beam gun which scans an oil surface or film. As the electron beam passes over the oil film the thickness of the film is altered by an amount dependent upon the magnitude of the electron beam which, in turn, is controlled by the modulating signal. As the film thickness varies the optical path length through the film varies, thus altering the phase of a light beam incident upon the film and imparting the modulation information to the light beam. This type of modulator and one well known system in which this type modulator is actually used (i.e., the Eidophor system) is more fully described in the book "Television, the Electronics of Image Transmission in Color and Monochrome," second edition, V. K. Zworkin and G. A. Morton, copyright 1940 and 1954, Library of Congress Catalog Card Number 54–11162, John Wiley and Sons Inc., New York, pages 284–287.

Because this system uses an oil film, electron beam type modulator it has certain inherent disadvantages and undesirable characteristics. The oil is apt to become contaminated after a period of time and when this happens the oil obviously cannot perform its intended function. This contamination also affects other portions of the system such as the electron beam gun to which the oil particles eventually migrate.

A number of techniques have been suggested to overcome the problems associated with the system just described. One involves the use of a reflective and conductive membrane of parabolic shape supported at its periphery by a ring. A plurality of conductor elements either of pie shape or concentric rings configuration is located below the membrane. Each conductor element is intended to be associated with a particular sector of the membrane. As energizing potentials are applied between the membrane and selected conductor elements the sectors of the membrane associated with the selected elements are deflected. It has been found, however, that other sectors of the membrane are also deflected to some extent because the various sectors of the membrane are not isolated from each other. This cross-talk effect is obviously undesirable since it results in improper deflection which, in turn, causes improper transfer of the modulation information to a light beam incident upon the membrane.

Another modulation technique which overcomes the problems associated with both the oil film system and the parabolic membrane reflector uses a plurality of individual reflecting elements. Each reflecting element has associated with it a transducer to which the modulation information is supplied. The transducer movement controls the position of the reflecting element. It is apparent that this modulation technique provides localized operation in that the various transducers and reflecting elements are isolated. The resolution of such a system is limited only by the size of the individual reflecting elements and transducers. While the limitations and disadvantages of the oil film and parabolic membrane reflector modulators are overcome by using a plurality of reflecting elements, it has been found that a complete and operative system based upon this technique is extremely expensive to fabricate since the individual reflector elements and transducers are very costly.

It is, therefore, an object of the present invention to provide a new and improved optical phase modulator.

It is another object of the present invention to provide an optical phase modulator which is simple in construction and inexpensive to fabricate.

It is a further object of the present invention to provide an optical phase modulator wherein the various sectors of the reflecting surface are isolated from one another.

It is a still further object of the present invention to provide a new and improved optical phase modulator which is reliable and not subject to an unusually short lifetime.

An optical phase modulator constructed in accordance with the present invention includes a ridged support member and a reflective and conductive membrane member stretched across the support member and supported on the top of the ridges thereof. This optical phase modulator also includes means for developing charge patterns in the wells of the support member to individually deflect portions of the membrane member. The optical phase modulator of this invention may be used, for example, in the Eidophor system as a substitute for the oil film, electron beam gun type optical phase modulator. In use, it is placed along the path of a light beam. On striking the membrane the beam will be reflected. The reflected beam will, however, be phase modulated at those portions of the beam which strike deflected portions of the membrane. The Eidophor system is, of course, only one application where phase modulating a beam of light has utility.

For a better understanding of the present invention, together with other and further objects thereof, reference is had to the following description, taken in connection with the accompanying drawings, and its scope will be pointed out in the appended claims.

Referring to the drawing.

DESCRIPTION AND OPERATION OF THE INVENTION

Figure 1:
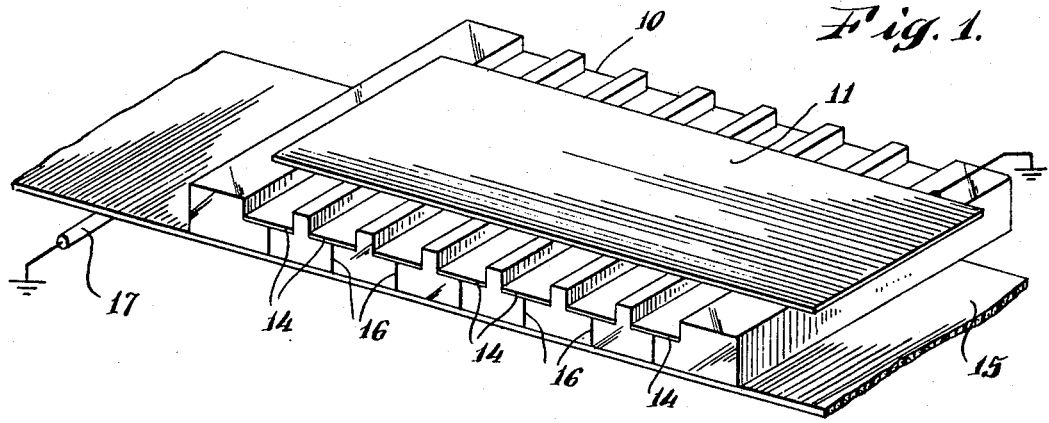
FIGURE 1 shows one embodiment of an optical phase modulator constructed in accordance with the present invention.
Figure 2:
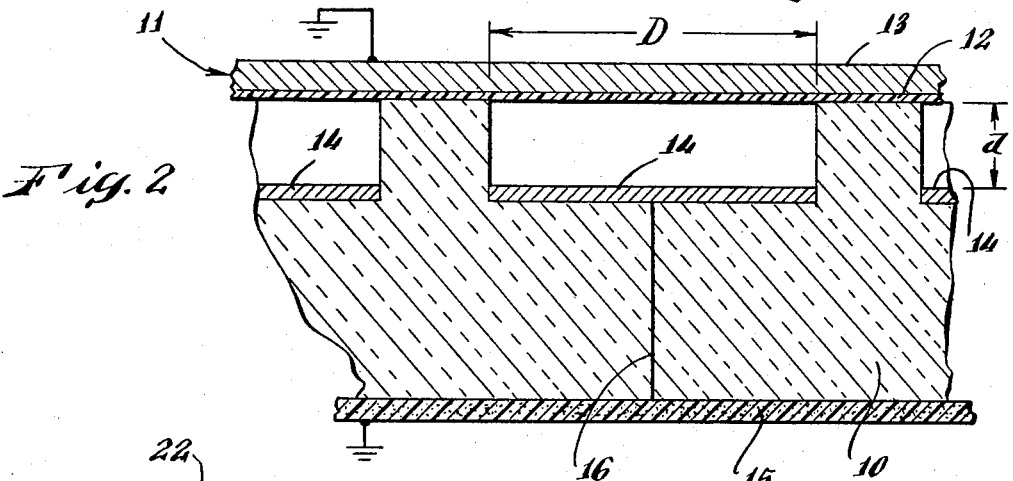
FIGURE 2 is a cross-section view of the optical phase modulator of FIGURE 1.

Referring to FIGURES 1 and 2, wherein similar elements have been given the same reference numerals, an optical phase modulator constructed according to the present invention includes a ridged support member 10.

Support member 10, functioning as a substrate, may be fabricated of conventional glass.

The invention also includes a reflective and conductive membrane member 11 stretched across substrate 10 and supported on the tops of the ridges of the substrate. Membrane member 11 is preferably composed of a thin membrane 12 of optically flat collodion and a reflective and conductive coating 13 on the opposite surface of the membrane from the substrate 10. As indicated in the drawing, membrane member 11, and more particularly the coating 13, is grounded.

The invention further includes a plurality of electrically independent conductor elements 14 in the wells of the substrate 10. Conductor elements 14 are preferably coated onto the substrate in the wells.

The invention finally includes means for developing charge patterns in the wells of the substrate 10 to individually deflect portions of the membrane member 11. This deflection is accomplished by applying energizing potentials between the membrane member 11 and selected conductor elements 14. The particular technique for deflecting the membrane member 11 in the FIGURE 1 embodiment involves the use of a length of dielectric tape 15 and a plurality of lead wires 16. The dielectric tape 15 is seen to be positioned adjacent substrate 10 but at the opposite surface from the membrane member 11. The backing or undersurface of the dielectric tape 15 is grounded as represented by the grounding of a roller 17. The dielectric tape 15 has charge patterns at prescribed spots according to the particular modulation information recorded on the tape by a recorder which is not shown.

Lead wires 16 run through the substrate 10. One end of each of the lead wires is individually connected to one of the conductor elements 14 while the other ends of the wires are exposed from the surface of the substrate adjacent the top of dielectric tape 15. As the dielectric tape 15 is moved to its appropriate position the charge patterns are positioned beneath the particular lead wires. The charge patterns appear at the conductor elements 14 in the wells due to a charge flow in the lead wires 16 which is electrostatically induced. This creates energizing potentials between the membrane member 11, and particularly the conductive coating 13 which is grounded, and the particular conductor elements 14 at which the charge patterns appear. The energizing potentials, in turn, cause the membrane member 11 to deflect in response to this potential. In this way, the reflective coating 13 is altered according to the modulation information recorded on the dielectric tape.

It is because of the ridge construction that those portions of the membrane member 11, stretched between the ridges which bound the wells in which the selected or energized conductor elements lie, are individually deflected. The greater the ratio of cross-section dimension D to depth $d$, the greater the degree of isolation between neighboring membrane sectors.

Figure 3:
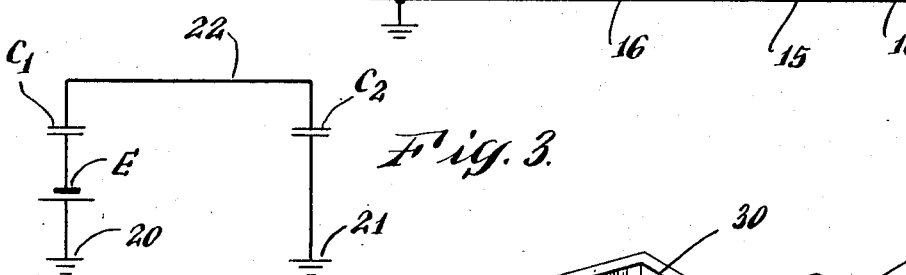
FIGURE 3 is the equivalent electrical diagram of the optical phase modulator of FIGURE 1.

FIGURE 3 shows the equivalent electrical diagram for the optical phase modulator of FIGURES 1 and 2. Point 20, at ground potential, corresponds to the backing of dielectric tape 15. Point 21, also at ground potential, corresponds to the reflective and conductive coating which is also at ground potential. Capacitor $C_1$ corresponds to the capacitance between the dielectric tape and the lead wires which are exposed at the bottom of substrate 10. Capacitor $C_2$ corresponds to the capacitance between membrane member 11, and particularly reflective and conductive coating 13, and conductor elements 14. Wire 22 corresponds to the lead wires 16. Battery E corresponds to the electrostatic potential pattern on the dielectric tape.

Figure 4:
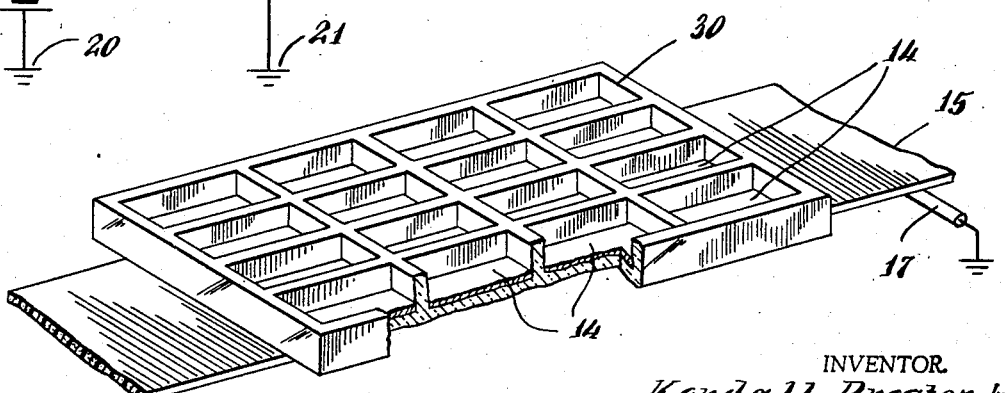
FIGURE 4 shows a portion of a second embodiment of an optical phase modulator constructed in accordance with the present invention.

FIGURE 4 shows a portion of a second embodiment of an optical phase modulator constructed according to the present invention. It is apparent that the primary difference between the embodiments of FIGURES 1 and 4 is the particular construction of the glass substrate 30. The substrate 30 in FIGURE 4 is seen to have ridges running in two directions instead of only in one direction. Despite this difference, an optical phase modulator utilizing such a substrate would operate in much the same manner as the modulator of FIGURE 1. It will be apparent that various other substrate configuration, such as substrates having circular wells, are possible.

It should also be pointed out that the substrates may have bottomless wells. For the embodiments of the invention just described, charge patterns on the dielectric tape are conducted by lead wires 16 to the conductor elements 14 positioned at the bottom of the wells of the substrate. It is entirely possible to deflect the membrane member 11 through the direct application of the charge patterns from the dielectric tape into the wells. In such a case the substrate has bottomless wells and the charge patterns are effectively transferred directly from the dielectric tape into the wells of the substrate.

While there have been described what are at present considered to be preferred embodiments of this invention, it will be obvious to those skilled in the art that various changes and modifications may be made therein without departing from the invention, and it is therefore aimed to cover all such changes and modificatitons as fall within the true spirit and scope of the invention.

I claim:

1. Apparatus for use in modulating the phase of a beam of light comprising:
    (a) an elongated nonconductive support member having a top surface, a bottom surface and a plurality of wells extending downward from the top surface;
    (b) a reflective and conductive membrane member stretched across the top surface of the support member and extending over the wells;
    (c) a conductor element located in each well spaced downward from the top surface of the nonconductive support member, each conductor element being electrically independent from each of the other conductor elements; and
    (d) means for establishing individual electrostatic charges on certain of said conductor elements so as to cause the portions of said reflective and conductive membrane member located above the wells containing said certain conductor elements to be electrostatically deflected downward into said wells, thus, changing the contour of said reflective and conductive membrane member.

2. The invention according to claim 1 and wherein said reflective and conductive membrane member comprises a sheet of collodion having reflective and conductive coatings.

3. The invention according to claim 1 and wherein said wells are channel shaped and arranged in a row extending along the length of the support member, the longitudinal axes of each channel being transverse to the longitudinal axes of the support member.

4. The invention according to claim 1 and wherein said wells are compartment shaped and arranged along the length of the support member in a series of parallel rows, each row containing at least one well.

5. The invention according to claim 1 and wherein the apparatus further includes individual conductive elements extending downward from each conductor element to the bottom surface of the support member for receiving electrostatic charges.

6. The apparatus according to claim 5 and wherein the means for establishing individual electrostatic charges on said certain conductor elements comprises a length of dielectric tape having a pattern of electric charges positioned along the bottom surface of the support member in contact with the conductive elements.

(References on following page)

References Cited

UNITED STATES PATENTS

| | | |
|---|---|---|
| 2,281,637 | 5/1942 | Sukumlyn. |
| 2,289,205 | 7/1942 | Nagy et al. _____ 350—161 X |
| 3,001,447 | 9/1961 | Ploke _____ 350—161 |
| 3,137,762 | 6/1964 | Baumgartner et al. ___ 350—161 |
| 3,306,160 | 2/1967 | Dinhobel et al. ____ 350—161 X |
| 3,322,485 | 5/1967 | Williams _____ 350—160 |

FOREIGN PATENTS 778,376  7/1957  Great Britain.

RONALD L. WILBERT, Primary Examiner

J. ROTHENBURG, Assistant Examiner

U.S. Cl. X.R.

329—144; 350—160